United States Patent Office 3,445,507
Patented May 20, 1969

3,445,507
NOVEL FLUORINATED ESTERS
Peter E. Newallis, Morris Plains, Julian A. Otto, Lake Tamarack, and Pasquale Lombardo, Hanover, N.J., assignors to Allied Chemical Corporation, New York, N.Y., a corporation of New York
No Drawing. Filed Mar. 4, 1966, Ser. No. 531,744
Int. Cl. A01n 9/24; C07c 69/62
U.S. Cl. 260—487                                19 Claims

ABSTRACT OF THE DISCLOSURE

Polyfluoroisopropyl alkanoates of the formula:

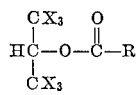

wherein X may be Cl or F and may be the same or different, wherein R is an unsubstituted alkyl group or a chlorinated alkyl group, with the proviso that at least three of the X atoms are fluorine and with the further proviso that when the number of X atoms which are F is three, R is a chlorinated lower alkyl group. These compounds possess biocidal properties, specifically insecticidal, nematocidal, or both.

---

This invention relates to the production of a novel class of fluorinated esters and more particularly to esters formed from certain 1,1,1,3,3,3-hexachlorofluoroisopropanols and unsubstituted or chloro-substituted alkanoic acids.

The esters of the invention, which will be referred to hereafter as polyfluoroisopropyl alkanoates, have the general formula:

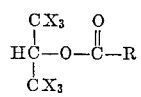

wherein X may be Cl or F and may be the same or different, wherein R is an unsubstituted alkyl group or a chlorinated alkyl group, with the proviso that at least three of the X atoms are fluorine and with the further proviso that when the number of X atoms which are F is 3, R is a chlorinated lower alkyl group. Preferably, the R group is an substituted or a chlorinated lower alkyl group containing 1-5 carbon atoms inclusive and still preferably from 1-2 carbon atoms inclusive.

It has been found that compounds embraced by the above formula possess distinctive and effective biocidal properties, specifically insecticidal, nematocidal, or both. In this regard, it is important to note that the subject compounds are closely and critically defined. As will be demonstrated by results of experimental testing to be reported hereafter, even apparently small deviations in structure from the narrow class of compounds of the invention can result in severe sacrifice in biocidal activity.

The essential and distinguishing structural limitations of the novel polyfluoroisopropyl alkanoates over previously known halogenated esters include the following: limitation of the alcohol moiety to an isopropyl configuration; hydrogen substitution in the 2-position of the isopropyl moiety, the otherwise perhalogenation of the isopropyl moiety, limitation of the halogen substitution in the alcohol moiety to chlorine and fluorine substitution, the requirement for at least three fluorine substitutions in the alcohol moiety and the requirement for chlorine substitution in the acid moiety when the number of fluorine atoms in the alcohol moiety is three.

It has further been found that certain subgroups of polyfluoroisopropyl alkanoates, as above defined, possess distinctive and certain significantly high biocidal properties not possessed by each other or by the generic group as a whole. Specifically, compound containing three or more fluorine atoms in the alcohol moiety and one or more chlorine atoms in the acid moiety were found to possess significant nematocidal activity. Compounds containing an unsubstituted alkyl group in the acid portion of the molecule and at least five fluorine atoms in the alcohol portion of the molecule were found to be characterized by the fact that they exhibit significant insecticidal activity and no signficant nematocidal activity. It was further found that compounds containing at least five fluorine atoms in the alcohol portion of the molecule and at least one chlorine atoms in the acid portion of the molecule possess both significant nematocidal activity and significant insecticidal activity. This was particularly surprising because it is well known that nematodes are a completely distinct class of animal organisms from insects and that there is no known basis for predicting nematocidal activity from insecticidal activity, or vice versa. In fact it is well known that most of the commercial insecticides are not effective nematocides.

Where it is noted that a given compound or class of compounds possesses significant or insignificant biocidal activity, it should be explained that such a conclusion is based upon ability to pass certain screening tests which will be described in the examples.

All of the compounds within the scope of the invention may be prepared by conventional esterification procedures. Such procedures merely involve the reaction of a 1,1,1,3,3,3-perchlorofluoroisopropanol of the formula:

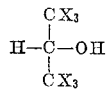

wherein X may be chlorine or fluorine and may be the same or different provided that at least three of the X atoms are fluorine, with an unsubstituted or chlorinated alkanoic acid, or preferably with the acid chloride of such an acid.

The unsubstituted or chlorinated alkanoic acids are well known chemicals and are commercially available or they may be prepared readily by conventional procedures. Preferably such acid reactants contain from 2–6 carbon atoms inclusive and still preferably from 2–3 carbon atoms inclusive.

The alcohol reactants may be prepared from the corresponding polyfluoroacetones, which are a known class of compounds, by reacting the latter with $NaBH_4$ or $LiAlH_4$. This is a well known reduction procedure for the preparation of alcohols from ketones.

The esterification reaction will proceed readily over a wide range of temperatures. The preferred range lies between about 0° C. up to the reflux temperature of the solvent, say about 100° C.

Atmospheric pressures or sub- or superatmospheric pressures may be employed.

As is customary, an inert organic solvent such as an ether, an aromatic hydrocarbon or a halogenated hydrocarbon is preferably employed in the esterification reaction.

In addition, the esterification reaction is preferably carried out in the presence of an acid acceptor, e.g. any of the well known bases which have been used for this purpose. Sodium carbonate, ammonium hydroxide and pyridine are illustrative of such materials.

The stoichiometry of the reaction requires a 1:1 molar ratio of reactants.

Product recovery involves no more than washing the product mixture with a mineral acid such as $H_2SO_4$ to remove basic impurities, separating the organic layer from the aqueous layer, drying the organic layer over a suitable desiccant such as anhydrous sodium sulfate and finally separating the solvent and sought-for product by simple distillation.

The following example demonstrates an illustrative technique for the preparation of the compounds of the invention.

EXAMPLE 1

A mixture of 50 g. of pyridine and 50 g. of methylene chloride was added slowly, over a period of about 45 minutes, with vigorous stirring, to a mixture of 84 g. (.50 mole) of hexafluoroisopropanol and 56.5 g. (.719 mole) of chloroacetyl chloride, which latter mixture had been cooled to about 0° C. During addition of the pyridine-methylene chloride mixture, the temperature in the reaction vessel was maintained below about 10° C. The resulting mixture was stirred for an additional period of about 2 to 3 hours, during which time the mixture was allowed to come to room temperature. At the end of this period, the mixture was washed with water and allowed to stand to form an organic layer and an aqueous layer. The organic layer was separated, washed with small portions of dilute sulfuric acid, dried over anhydrous sodium sulfate and then was distilled to separate the methylene chloride solvent and 98 g. of a water-white liquid boiling at 109–112° C. The product was identified as being 1,1,1,3,3,3-hexafluoroisopropyl chloroacetate. The 98 g. recovered corresponds to a yield of about 80%.

*Analysis.*—Calculated for $C_5H_4F_6O_2$: Cl, 14.5%. Found: Cl, 14.8%.

EXAMPLES 2–12

The procedure described in Example 1 was repeated with a variety of other reactants to give the results indicated in following Table I. Variations in procedure were immaterial and did not influence the course of the reaction. Illustrative such non-material variations include: varying molar ratios of reactants and varying mixing and contact times of the reactants. The essential data are given in Table I. All the products were water-white liquids.

TABLE I

| Ex. | Alcohol reactant | Grams | Acid reactant | Grams | Ester product | Grams | B.P. |
|---|---|---|---|---|---|---|---|
| 2 | 1,1,1,3,3,3-hexafluoroisopropanol. | 33.6 | Trichloroacetyl chloride. | 36.4 | 1,1,1,3,3,3-hexafluoroisopropyl trichloroacetate. | 42 | 31° C./12 mm. Hg. |
| 3 | 1,1,1,3,3,3-monochloropentafluoro-isopropanol. | 92.3 | Chloroacetyl chloride. | 56.5 | 1,1,1,3,3,3-monochloropentafluoroisopropyl chloroacetate. | 110 | 134–138° C. |
| 4 | 1,1,3-trichloro-1,3,3-trifluoroisopropanol. | 72.5 | ...do... | 38 | 1,1,3-trichloro-1,3,3-trifluoroisopropyl chloroacetate. | 80.5 | 89–93° C. |
| 5 | 1,1,1,3,3,3-hexafluoroisopropanol. | 16.8 | 2,2-dichloropropionyl chloride. | 16.2 | 1,1,1,3,3,3-hexafluoroisopropyl 2,2-dichloro-propionate. | 8.5 | 65–67° C. |
| 6 | 1,1,3-trichloro-1,3,3-trifluoroisopropanol. | 21.8 | ...do... | 16.2 | 1,1,3-trichloro-1,3,3-trifluoroisopropyl 2,2-dichloropropionate. | 12.5 | 127° C./60 mm. |
| 7 | 1,1,1,3,3,3-monochloropenta-fluoroisopropanol. | 18.5 | ...do... | 16.2 | 1,1,1,3,3,3-monochloropentafluoroisopropyl 2,2-dichloropropionate. | 13.5 | 65–69° C./40 mm. |
| 8 | 1,1,1,3,3,3-monochloropentafluoroisopropanol. | 55.4 | Acetyl chloride. | 23.6 | 1,1,1,3,3,3-monochloropentafluoroisopropyl acetate. | 58.5 | 100–101° C. |
| 9 | 1,1,1,3,3,3-hexafluoroisopropanol. | 84 | Propionyl chloride. | 46.3 | 1,1,1,3,3,3-hexafluoroisopropyl propionate. | 50.5 | 86–87° C. |
| 10 | 1,3-dichloro-1,1,3,3-tetrafluoroisopropanol | | n-Caproyl chloride. | | 1,3-dichloro-1,1,3,3-tetrafluoroisopropyl n-caproate. | | |
| 11 | 1,1-dichloro-1,3,3,3-tetrafluoroisopropanol. | | 2,2-dichlorovaleryl chloride. | | 1,1-dichloro-1,3,3,3-tetrafluoroisopropyl 2,2-dichloro-n-valerate. | | |
| 12 | 1,3-dichloro-1,1,3,3-tetrafluoroisopropanol. | | 2,2,3-tetrachlorobutyryl chloride. | | 1,3-dichloro-1,1,3,3-tetrafluoroisopropyl 2,2,3,3-tetrachlorobutyrate. | | |

The following indicated ester products may be prepared in a like manner from the indicated materials.

EXAMPLES 13–25

The compounds listed in following Table II were tested for insecticidal activity against several important insect pests by the following procedure. A 1.5 inch diameter tin container having a perforated lid and containing about 10 insects and a small amount of some appropriate food, such as grain or flour, was placed into a gallon mason jar. A 0.1 cc. unit of the toxicant was pipetted onto an absorbent cellulose wad and the wad was put into the mason jar. The jar was then sealed. After 24 hours' exposure the mason jar was opened, the insect container was removed and a mortality count was made immediately and at various day intervals. The results of the tests made are set forth in Table II. A compound was considered to have significant insecticidal activity and passed the test if the mortality count reached 80% within a six day period following the exposure period. Compounds which did not achieve this rating within the indicated time period were deemed to have no significant insecticidal activity and failed the test.

TABLE II

| Example | Toxicant | Days after exposure | Percent mortality | | |
|---|---|---|---|---|---|
| | | | CFBL | LML | BCBL |
| 13 | 1,1,1,3,3,3-hexafluoroisopropyl acetate. | 0 | 100 | 100 | |
| | | 1 | 100 | 100 | |
| | | 2 | 100 | 100 | |
| 14 | 1,1,1,3,3,3-monochloropentafluoroisopropyl chloroacetate. | 3 | 100 | 100 | 100 |
| 15 | 1,1,1,3,3,3-hexafluoroisopropyl 2,2-dichloropropionate. | 5 | 100 | 100 | ¹ 80 |
| 16 | 1,1,1,3,3,3-monochloropentafluoroisopropyl acetate. | 6 | 100 | 100 | |
| 17 | 1,1,1,3,3,3-hexafluoroisopropyl propionate. | 6 | 100 | 100 | |
| 18 | 1,1,1,3,3,3-hexafluoroisopropyl chloroacetate. | 3 | 100 | 80 | 80 |
| | | 4 | 100 | 100 | 100 |
| 19 | 1,1,1,3,3,3-hexafluoroisopropyl trichloroacetate. | 5 | 100 | 100 | ¹ 80 |
| 20 | 1,1,1,3,3,3-monochloropentafluoroisopropyl 2,2-dichloropropionate. | 5 | 100 | 100 | |
| 21 | 1,1,3,3-tetrachloro-1,3-difluoroisopropyl chloroacetate. | | F | F | F |
| 22 | 1,1,3,3-tetrachloro-1,3-difluoroisopropyl 2,2-dichloropropionate. | | | 40 | |
| 23 | 1,1,3-trichloro-1,3,3-trifluoroisopropyl acetate. | | F | F | F |
| 24 | 1,1,3,3-tetrachloro-1,3-difluoroisopropyl acetate. | | F | F | F |
| 25 | 1,1,3-trichloro-1,3,3-trifluoroisopropyl propionate. | | F | F | F |

¹ MORIBUND—Nearly dead.
F—Failure, CFBL—Confused flour beetle (adults), LML—Lesser mealworm (larvae), BCBL—Black carpet beetle (larvae).

EXAMPLES 26–37

The compounds listed in following Table III were tested for nematocidal activity by a procedure similar to that employed in Examples 13–25. About 100 *Panagrellus redivivus* (Linne) nematodes were placed in a 2 inch x ¾ inch petri dish containing 5 ml. of distilled water. The dish was placed in a gallon mason jar. A 0.1 cc. unit of the toxicant was pipetted onto an absorbent cellulose wad and the wad was put into the mason jar. The jar was then sealed. After 24 hours' exposure, the mason jar was opened, the nematode container was removed and a mortality count was made immediately and at day intervals. The results of the tests made are set forth in Table III. A compound was considered to have significant nematocidal activity and passed the test if the mortality count reached 80% within a two day period following the exposure period. Compounds which did not achieve this rating within the indicated time were deemed to have no significant nematocidal activity and failed the test.

TABLE III

| Example | Toxicant | Percent mortality | | |
|---|---|---|---|---|
| | | 0 day | 1 day | 2 days |
| 26 | 1,1,1,3,3,3-hexafluoroisopropyl 2,2-dichloropropionate. | 85 | 99 | 100 |
| 27 | 1,1,3-trichloro-1,3,3-trifluoroisopropyl 2,2-dichloropropionate. | 55 | 80 | 98 |
| 28 | 1,1,1,3,3,3-hexafluoroisopropyl chloroacetate. | 100 | 100 | 100 |
| 29 | 1,1,1,3,3,3-hexafluoroisopropyl trichloroacetate. | 100 | 100 | 100 |
| 30 | 1,1,3-trichloro-1,3,3-trifluoroisopropyl chloroacetate. | 95 | 100 | 100 |
| 31 | 1,1,1,3,3,3-monochloropentafluoroisopropyl 2,2-dichloropropionate. | 85 | 95 | 100 |
| 32 | 1,1,3,3-tetrachloro-1,3-difluoroisopropyl 2,2-dichloropropionate. | F | F | F |
| 33 | 1,1,1,3,3,3-monochloropentafluoroisopropyl acetate. | F | F | F |
| 34 | 1,1,3-trichloro-1,3,3-trifluoroisopropyl acetate. | F | F | F |
| 35 | 1,1,3,3-tetrachloro-1,3-difluoroisopropyl acetate. | F | F | F |
| 36 | 1,1,1,3,3,3-hexafluoroisopropyl propionate. | F | F | F |
| 37 | 1,1,3-trichloro-1,3,3-trifluoroisopropyl propionate. | F | F | F |

The criticality of the limitations for the various subgroups of compounds possessing distinctive properties, as described above, may readily be confirmed by reference to above Tables II and III. For example, in one of the subgroups delineated above it is indicated that in order to exhibit significant nematocidal activity, the polyfluoroisopropyl alkanoate must possess at least three fluorine atoms in the alcohol moiety and at least one chlorine atom in the acid moiety. It can be seen from Table III, Example 32, that a polyfluoroisopropyl alkanoate which contains chlorine substitution in the acid portion of the molecule but which contains fewer than three fluorine atoms in the alcohol portion of the molecule, does not pass the screening test for significant nematocidal activity. Similarly, it may be seen from Examples 33–37 that regardless of whether the fluorine content in the alcohol moiety is as high as 6; if the acid moiety contains no chlorine substitution, the resulting compounds will not pass the screening test for significant nematocidal activity.

Another subgroup of compounds which has been delineated above includes those in which there is no chlorine substitution in the acid portion of the molecule and in which at least five fluorine atoms are present in the alcohol portion of the molecule. This subgroup is characterized by exhibiting significant insecticidal activity with no significant nematocidal activity. The failure of these compounds as nematocides is documented by Examples 33 and 36 as shown in Table III. Their success as insecticides is shown in Table II by Examples 13, 16 and 17. The failure of related polyfluoroisopropyl alkanoates which contain no substitution in the acid portion of the molecule and fewer than five fluorines in the alcohol portion of the molecule is documented by Examples 23–25 of Table II.

Still another subgroup of polyfluoroisopropyl alkanoates delineated above are those which contain at least five fluorine atoms in the alcohol portion of the molecule and at least one chlorine atom in the acid portion of the molecule. These compounds are characterized by the possession of both significant nematocidal activity and significant insecticidal activity. Successful insecticidal tests of such compounds are shown by Examples 14, 15, 18, 19 and 20 of Table II. Successful nematocidal tests of such compounds are shown by Examples 26, 28, 29 and 31 of Table III. The five or more fluorine criticality and the chlorine substitution criticality of this subgroup for the dual biocidal activity may be appreciated from a consideration of the discussion immediately above wherein it is demonstrated that compounds containing no chlorine substitution in the acid portion of the molecule do not exhibit significant nematocidal activity, see for instance Examples 33 and 36 of Table III, and wherein it is demonstrated that compounds containing chlorine substitution in the acid portion of the molecule but fewer than five fluorine atoms in the alcohol portion of the molecule do not exhibit any significant insecticidal activity, see for instance Examples 21 and 22 of Table II.

The necessity for the limitation that the acid portion of the molecule must contain some chlorine when the alcohol portion of the molecule contains only three fluorine atoms, for the resulting compounds to have any biocidal activity, as above described, may be appreciated when reference is made to the unsuccessful insecticidal tests made on such compounds as evidenced by Examples 23 and 25 and by the unsuccessful nematocidal tests which were made on such compounds as evidenced by Examples 34 and 37. Successful biocidal tests on compounds which contain three fluorine atoms in the alcohol portion of the molecule and some chlorine substitution in the acid portion of the molecule are shown by Example 27.

We claim:
1. Polyfluoroisopropyl alkanoates of the formula:

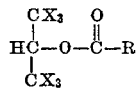

wherein X may be Cl or F and may be the same or different, wherein R is an unsubstituted alkyl group or a chlorinated alkyl group and provided that at least three of the X atoms are fluorine, with the further proviso that when the number of X atoms which are F is three, R must be a chlorinated alkyl group.

2. Polyfluoroisopropyl alkanoates according to claim 1 in which the R group contains from 1–5 carbon atoms inclusive.

3. Polyfluoroisopropyl alkanoates according to claim 2 in which the R group contains from 1–2 carbon atoms inclusive.

4. Polyfluoroisopropyl alkanoates according to claim 3 in which five of the X atoms are fluorine and in which R is a chlorinated alkyl group.

5. Polyfluoroisopropyl alkanoates according to claim 3 in which at least five of the X atoms are fluorine.

6. Polyfluoroisopropyl alkanoates according to claim 3 in which all the X atoms are F.

7. Polyfluoroisopropyl alkanoates according to claim 3 in which R is a chlorinated alkyl group.

8. Polyfluoroisopropyl alkanoates according to claim 3 in which R is an unsubstituted alkyl group.

9. Polyfluoroisopropyl alkanoates according to claim 3 in which at least five of the X atoms are fluorine and in which R is an unsubstituted alkyl group.

10. Polyfluoroisopropyl alkanoates according to claim 3 in which three of the X atoms are fluorine and in which R is a chlorinated alkyl group.

11. Polyfluoroisopropyl alkanoates according to claim 3 in which all the X atoms are fluorine and in which R is a chlorinated alkyl group.

12. Polyfluoroisopropyl alkanoates according to claim 3 in which all the X atoms are fluorine and in which R is an unsubstituted alkyl group.

13. 1,1,1,3,3,3 - monochloro-pentafluoropropyl chloroacetate.
14. 1,1,1,3,3,3 - hexafluoroisopropyl trichloroacetate.
15. 1,1,1,3,3,3 - monochloropentafluoroisopropyl 2,2-dichloropropionate.
16. 1,1,1,3,3,3 - hexafluoroisopropyl 2,2 - dichloropropionate.
17. 1,1,1,3,3,3-hexafluoroisopropyl acetate.
18. 1,1,1,3,3,3-monochloropentafluoroisopropyl acetate.
19. 1,1,1,3,3,3-hexafluoroisopropyl propionate.

References Cited
UNITED STATES PATENTS
| | | | |
|---|---|---|---|
| 3,030,409 | 4/1962 | Andreades et al. | 260—488 |
| 3,177,185 | 4/1965 | Hollander et al. | 260—486 XR |
| 3,189,656 | 6/1965 | Gordon et al. | 260—633 |
| 3,359,296 | 12/1967 | Newallis et al. | 260—633 XR |

OTHER REFERENCES
Tsin-Yun Chen, Chem. Ab., vol. 54: 24, 385h (1960).

LORRAINE A. WEINBERGER, *Primary Examiner.*

ALBERT P. HALLUIN, *Assistant Examiner.*

U.S. Cl. X.R.

260—488; 424—311